United States Patent [19]

Suzuki

[11] Patent Number: 4,867,688
[45] Date of Patent: Sep. 19, 1989

[54] ELECTRICAL CONNECTING APPARATUS FOR STEERING WHEEL AND STEERING COLUMN

[75] Inventor: Masaru Suzuki, Aichi, Japan

[73] Assignee: Kabushiki Kaisha Tokai Rika Denki Seisakusho, Aichi, Japan

[21] Appl. No.: 257,937

[22] Filed: Oct. 14, 1988

[30] Foreign Application Priority Data

Oct. 17, 1987 [JP] Japan .............................. 62-159180[U]

[51] Int. Cl.$^4$ ........................................... H01R 35/00
[52] U.S. Cl. ........................................................ 439/15
[58] Field of Search ....................... 439/11, 13, 15, 162

[56] References Cited

U.S. PATENT DOCUMENTS

| 4,422,699 | 12/1983 | Sakurai et al. | |
|---|---|---|---|
| 4,451,105 | 5/1984 | Sakurai . | |
| 4,722,690 | 2/1988 | Priede | 439/15 |
| 4,789,342 | 12/1988 | Shitanoki | 439/15 |

FOREIGN PATENT DOCUMENTS 53-118243 9/1978 Japan .
57-66045 4/1982 Japan .

Primary Examiner—Gary F. Paumen
Attorney, Agent, or Firm—Birch, Stewart, Kolasch & Birch

[57] ABSTRACT

The disclosure relates to an apparatus for making an electrical connection between a steering wheel and a steering column in the steering system of a vehicle, and more particularly, to the apparatus having an indication for indicating the number of rotations of the steering wheel. The apparatus includes a stationary case to be fixed to the steering column, a rotor member rotatable together with the steering wheel, and a coiled tape member. This tape member provides an electrical connection between the steering wheel and the steering column and is accommodated in a case comprising the stationary case and the rotor member. The apparatus further comprises a sprocket mounted on the rotor member, an internal gear formed on the inner face of the stationary case, and a ring-shaped member rotatably provided between the sprocket and the internal gear. The ring-shaped member has a plurality of windows arranged in a pitch different from the pitch between the teeth of the internal gear. The sprocket engages with the internal gear through the windows of the ring-shaped member. The ring-shaped member will slightly shift relative to the stationary case when the rotor member rotates with the rotation of the steering wheel. The shift of the ring-shaped member can be detected by a change in relative position between the position mark indicated on the ring-shaped member and the position mark indicated on either the stationary case or the rotor member.

5 Claims, 2 Drawing Sheets

ELECTRICAL CONNECTING APPARATUS FOR STEERING WHEEL AND STEERING COLUMN

BACKGROUND OF THE INVENTION

1. Field of the invention

The present invention relates to an apparatus for making the electrical connection between a steering wheel and a steering column in the steering system of a vehicle, and more particularly, to an apparatus of the above-described type having indication means which indicates the number of rotations of the steering wheel.

2. Description of the prior art

Normally, a spiral coiled tape which is flexible and provided with a plurality of electric conductors is used to make an electrical connection between a steering wheel and a steering column in a conventional steering system of a vehicle (for example, Japanese Laid-Open Utility Model Publication No. 53-118243 and Japanese Laid-Open Patent Publication No. 57-66045). In the above-described apparatuses, the coiled tape is accommodated in an accommodating case comprising a stationary case and a movable case. One end of the coiled tape is fixed to the stationary case and the other end thereof is fixed to the movable case.

In the apparatus for carrying out an electrical connection having the above-described construction there is, however, a disadvantage in that it is impossible to visually check from the outside of the accommodating case whether or not the neutral positions of the steering wheel and the spiral coiled tape accommodated in the accommodating case correspond to each other. This makes it difficult to mount, the apparatus which has been dismounted from the vehicle, on the vehicle back with the coiled tape set in the neutral position in the accommodating case. If the steering wheel and the movable case are connected to each other, i.e., if both are connected to each other with the coiled tape tightened or loosened, the coiled tape may be cut due to the rotation of the steering wheel.

SUMMARY OF THE INVENTION

Accordingly, it is an the object of the present invention to provide an apparatus for the electrical connection between a steering wheel and a steering column in which the neutral state of a coiled tape accommodated in an accommodating case can be checked from the outside of the accommodating case so that the adjustment between a steering wheel and the coiled tape can be easily obtained.

In accomplishing this and other objects, according to the present invention, an apparatus for making the electrical connection between a steering wheel and a steering column is provided comprising an accommodating case including a stationary case fixed to the steering column and a lid-shaped rotor member rotatably mounted on the stationary case so as to be rotatable together with the steering wheel and a coiled tape flexible and spirally formed to follow the rotation of the steering wheel and mounted in the accommodating case with one end thereof fixed to the stationary case side and the other end thereof fixed to the lid-shaped rotor member side.

Further, an internal gear to be fixed to the stationary case is disposed in the inner circumference of the accommodating case in concentric relationship with the lid-shaped rotor member. In addition, a ring-shaped member is disposed inwardly of the internal gear so as to be rotatable relative to the stationary case and the lid-shaped rotor member and having a plurality of windows spaced at regular intervals therebetween in the circumferential direction thereof so as to confront the teeth of the internal gear. Furthermore, a sprocket is rotatably supported by the lid-shaped rotor member to engage the internal gear through the window of the ring-shaped member. In the above-described construction, the pitch between adjacent windows of the ring-shaped member is different from the pitch of the teeth of the internal gear and the top surface of the ring-shaped member is provided with indication means which cooperates with a mating mark provided either on the stationary case or on the lid-shaped rotor member.

According to the above-described construction, when the lid-shaped rotor member is rotated by the steering wheel, the ring-shaped member is rotated by the sprocket along the internal gear. This is because the pitch between adjacent windows formed on the ring-shaped member is different from that of adjacent teeth of the internal gear. That is, the sprocket rotates on its axis and around the steering shaft along the internal gear in engagement with the internal gear in response to rotation of the lid-shaped rotor member. Further, the sprocket engages the teeth of the internal gear through the window of the ring-shaped member. As described above, the pitch between adjacent windows formed on the ring-shaped member is different from that of the teeth of the internal gear. Accordingly, the ring-shaped member circumferentially moves, or shifts by the difference between the pitch of the windows and the pitch of the teeth of the internal gear per rotation of the sprocket along the internal gear because the ring-shaped member rotates relative to the stationary case and the lid-shaped rotor member.

Accordingly, utilizing the shift of the ring-shaped member with respect to the accommodating case, it is possible to detect the condition of the spiral configuration of the coiled tape in the accommodating case operated by the lid-shaped rotor member. That is, the ring-shaped member is provided with an indication mark which corresponds to a mating mark provided on either the stationary case or the lid-shaped rotor member when the coiled tape is in the neutral state, so that detecting of whether or not the coiled tape has been tightened or loosened can be determined by the position difference between both marks.

Thus, the spiral state of the coiled tape operated by the lid-shaped rotor member can be detected by the above-described indication means (for example, the mating mark), which enables a visual checking from the outside of the accommodating case as to whether or not the coiled tape is in the neutral position. Specifically, the indication means, for example, the mating mark is pointed out to zero when the coiled tape is in the neutral state. Then, the graduation corresponding to the circumferential movement (shift) amount of the ring-shaped member is made on the ring-shaped member per rotation of the lid-shaped rotor member. Thus, the change of the configuration of the coiled tape made by the rotation of the steering wheel can be found through the graduation. Needless to say, the provision of the mating mark is sufficient to detect only the neutral position of the coiled tape.

Thus, the indication means provided with the apparatus in accordance with the present invention enables the detection from the outside of the accommodating case as to whether or not the coiled tape accommodated in the accommodating case is in the neutral position. Further, utilizing the graduation in addition to the mating mark, it is possible to know how many times the steering wheel (or the lid-shaped rotor member) is rotated to return the coiled tape to the neutral position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The object and feature of the present invention will be become apparent from the following description taken in conjunction with the preferred embodiment thereof with reference to the accompanying drawings which are given by way of illustration only, and thus are not limitative of the present invention, and, in which.

DETAILED DESCRIPTION OF THE INVENTION

An embodiment of the present invention is described with reference to FIGS. 1 through 4.

Figure 1:
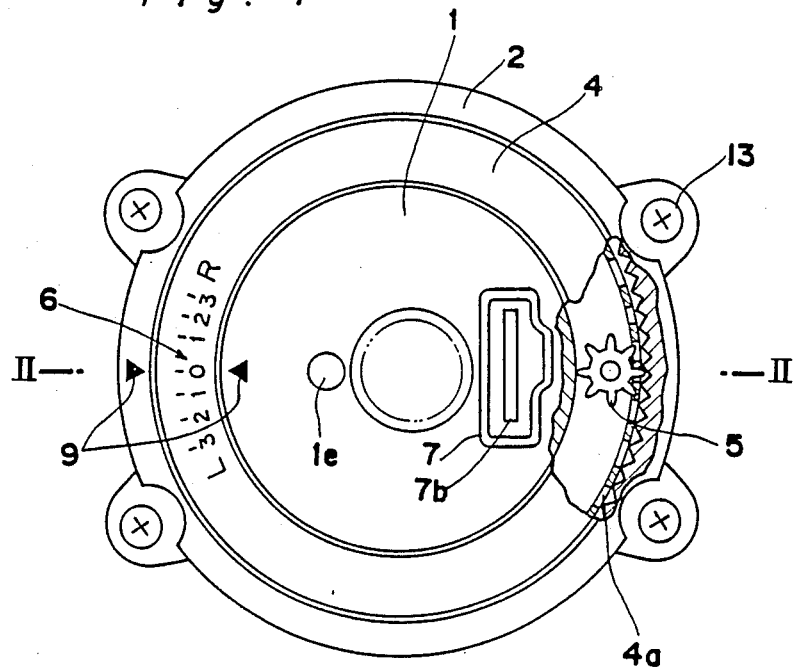
FIG. 1 is a top plan view, partially in section, of an electrical connecting apparatus according to an embodiment of the present invention.
Figure 2:
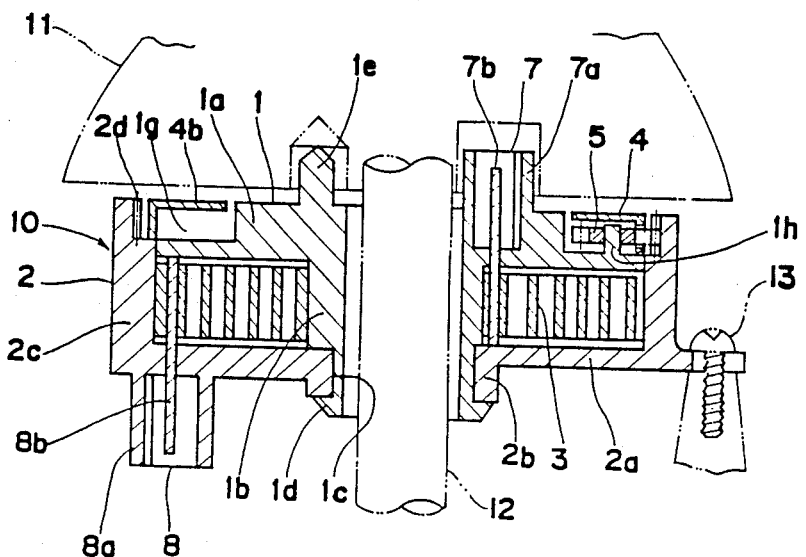
FIG. 2 is a sectional view taken along a line II—II shown in FIG. 1.

Referring to FIGS. 1 and 2, a spiral coiled tape denoted by reference numeral 3 is accommodated in a substantially doughnut-shaped accommodating case 10 comprising a lid-shaped rotor member 1 and a stationary case 2. A steering shaft 12 extends through the center portion of the accommodating case 10.

The lid-shaped rotor member 1 is so configured as to serve as the lid of the accommodating case 10. That is, a disk-shaped lid body 1a disposed inside the stationary case 2 is integrated with a boss portion 1b formed in the central portion of the lid-shaped rotor member 1 and serving as the take-up shaft of the coiled tape 3, thus forming the lid-shaped rotor member 1. A pin 1e projecting toward a steering wheel 11 and a connector-surrounding wall 7a are also integrated with the lid body 1a, respectively. The steering shaft 12 extends through the center of the boss portion 1b serving as the take-up shaft. A groove 1c is formed on the outer circumference of the boss portion 1b, at its lower portion. An engaging claw 1d is disposed below the groove 1c. The insertion of the pin 1e into a hole formed in the steering wheel 11 allows the lid-shaped rotor member 1 to rotate together with the steering wheel. A step 1g is formed on the outer circumference of the disk-shaped lid body 1a. A disk-shaped bottom wall 2a, a boss 2b for supporting the lid-shaped rotor member 1 provided with a hole in the center thereof, and a circumferential wall 2c standing erect from the peripheral edge of the bottom wall 2a are integrated with each other, thus forming the stationary case 2 which is substantially U-shaped in a sectional view. The outer peripheral face of the bottom wall 2a is integrated with a connector-surrounding wall 8a into which a cable disposed on the steering column side is inserted. The stationary case 2 is fixed to the steering column side with screws 13. The internal surface of the circumferential wall 2c confronting the step 1g of the disk-shaped lid body 1a is cut to form a gear portion, namely, an internal gear 2d.

The boss portion 1b for taking up the lid-shaped rotor member 1 is inserted into the hole of the boss 2b of the stationary case 2, and the wall of the hole of the boss 2b is fixedly fitted in the groove 1c forming the lower portion of the take-up boss portion 1b. The lid-shaped rotor member 1 is supported by the claw 1d which forms the lower end portion of the take-up boss portion 1b so that the lid-shaped rotor member 1 does not release from the stationary case 2.

The coiled tape 3 is disposed in the stationary case 2 and under the disk-shaped lid body 1a and the internal end portion thereof is fixed to a printed wiring board 7b mounted in the accommodating case 10 so as to project into the connector-surrounding wall 7a disposed on the side of the lid-shaped rotor member 1, and the external end portion thereof is fixed to a printed wiring board 8b projecting into the connector-surrounding wall 8a disposed on the side of the stationary case 2. Briefly describing the construction of the electrical connection, respective conductors (not shown) are buried in the coiled tape 3 and project from the internal end portion thereof where they are soldered for the electrical connection to the respective contacts of the printed wiring board 7b provided on the side of the lid-shaped rotor member 1. Respective conductors (not shown) projecting from the external end portion of the coiled tape 3 are soldered for the electrical connection to the respective contacts of a printed wiring board 8b provided on the side of the stationary case 2. Accordingly, the cable provided with the steering wheel is connected to the connector of the external terminal 7 and the cable provided with the steering column is connected to the connector of the external terminal 8. Thus, both cables are connected to each other.

Figure 3:
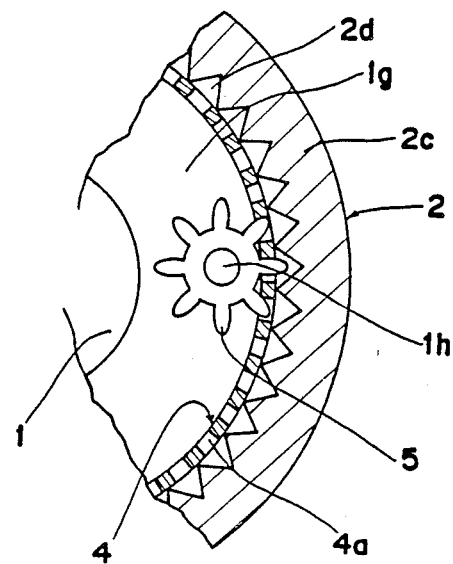
FIG. 3 is an enlarged sectional view showing an internal gear, a sprocket, and a ring-shaped member in engagement with each other shown in FIG. 1.
Figure 4:
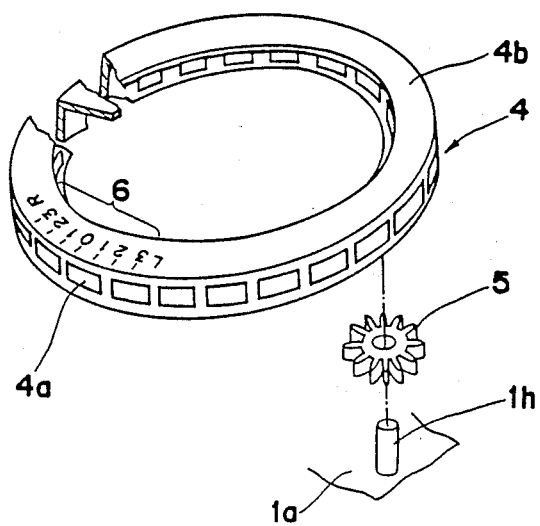
FIG. 4 is a perspective view showing a ring-shaped member.

At a predetermined position of the step 1g of the disk-shaped lid body 1a, a sprocket 5 is provided which engages with the internal gear 2d formed on the circumferential wall 2c of the stationary case 2. The sprocket 5 is rotatably mounted on the shaft 1h standing erect in the step 1g. As shown in FIGS. 3 and 4, a ring-shaped member 4 which is L-shaped in sectional view is disposed inwardly from the internal gear 2d. The ring-shaped member 4 has a plurality of windows 4a spaced at regular intervals in the circumferential direction thereof. The pitch between adjacent windows 4a is different from that of the internal gear 2d. The ring-shaped member 4a is disposed in the step 1g so that the respective windows 4a confront the teeth of the internal gear 2d in the circumferential direction thereof. The ring-shaped member 4 is provided with a graduation 6 showing the number of rotations of the steering wheel 11. The graduation is provided in a predetermined position of the upper face 4b which has no windows 4a. The stationary case 2 or the lid-shaped rotor member 1 is provided with a mating mark 9 at the position corresponding to the zero point of the graduation 6. The ring-shaped member 4 is engaged with the internal gear 2d. The ring-shaped member 4 is inserted inwardly from the lid-shaped rotor member 1. Then, one of the teeth of the sprocket 5 is penetrated through one of the windows 4a at the position in which the teeth groove of the internal gear 2d confronts the window 4a with the internal gear 2d confronting the shaft 1h. When the ring-shaped member 4 is inserted as described above, the shaft 1h is inserted through the sprocket 5.

According to the above-described construction, rotation of the steering wheel 11 the lid-shaped rotor 1 will rotate in response to. With the rotation of the lid-shaped rotor member 1, the sprocket 5 rotates on the shaft 1h and around the steering shaft 12 along the internal gear 2d. It is to be noted that the ring-shaped member 4 circumferentially moves in a slight degree. This is because if the pitch between adjacent windows 4a formed on the ring-shaped member 4 is the same as that of the internal gear 2d, the ring-shaped member 4 is not moved circumferentially by the rotation of the sprocket 5 around the steering shaft 12 in engagement with the internal gear 2d through the window 4a. As described above, both pitches are different from each other. Accordingly, the ring-shaped member 4 circumferentially moves a distance corresponding to the difference between both pitches per rotation of the sprocket 5 around the steering shaft 12. This is because the ring-shaped member 4 rotates relative to the stationary case 2 and the lid-shaped rotor member 1. That is, the ring-shaped member 4 circumferentially moves the above-described distance per rotation of the steering wheel 11.

The graduation 6 is made on the ring-shaped member 4 and the mating mark 9 is made either on the stationary case 2 or on the lid-shaped rotor member 1. Accordingly, the direction in which the steering wheel 11 is rotating can be detected by using the graduation 6 and the mating mark 9. Further, it is also possible to find the number of rotations the steering wheel 11 makes from the neutral position of the coiled tape 3. That is, the zero points of the mating mark 9 and the graduation 6 are adjusted to coincide with each other when the coiled tape 3 is in the neutral state, and the graduation 6 is moved for every shift amount of the ring-shaped member 4 per rotation of the lid-shaped rotor member 1.

As apparent from the description made above, the apparatus for making the electrical connection between the steering wheel and the steering column in accordance with the present invention is capable of quantitatively indicating the configuration of the coiled tape 3 which changes its entire configuration according to the rotation of the steering wheel. That is, the apparatus is capable of specifically and quantitatively indicating the state of the spiral configuration. Accordingly, it is possible to detect the neutral position of the coiled tape easily and accurately, so that a mis-alignment between the steering system and the coiled tape 3 which may occur in re-mounting the apparatus to a vehicle can be effectively prevented, and needless to say, the coiled tape 3 can be prevented from being cut due to the mis-alignment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for making an electrical connection between a steering wheel and a steering column, such apparatus comprising:
    an accommodating case including a stationary case fixed to the steering column and a lid-shaped rotor member rotatably mounted on the stationary case to be rotatable together with the steering wheel;
    a coiled flexible tape which is spirally formed to follow the rotation of the steering wheel and which is mounted in said accommodating case with one end thereof fixed to the stationary case and the other end thereof fixed to said lid-shaped rotor member;
    an internal gear fixed to the stationary case and disposed in the inner circumference of said accommodating case in concentric relationship with said lid-shaped rotor member, said internal gear having a plurality of teeth;
    a ring-shaped member disposed inwardly of said internal gear to be rotatable relative to said stationary case and said lid-shaped rotor member, said ring-shaped member having a plurality of windows spaced at regular intervals in a circumferential direction thereof to permit access to the teeth of said internal gear;
    a sprocket rotatably supported by said lid-shaped rotor member and being disposed to engage said internal gear by penetrating through the window of said ring-shaped member, wherein the pitch between adjacent windows of said ring-shaped member is different from the pitch of the teeth of said internal gear; and
    indication means for cooperating with a mating mark provided on at least one of the stationary case and the lid-shaped rotor member, said indication means being provided on a top surface of said ring-shaped member.

2. The apparatus as recited in claim 1, wherein the steering column is rotatable about a central axis and the lid-shaped rotor member is also rotatable about the central axis, said sprocket is rotatable about a shaft having an axis offset from the central axis.

3. The apparatus as recited in claim 1, wherein the sprocket is mounted on a shaft attached to said lid-shaped rotor member.

4. The apparatus as recited in claim 1, wherein said indication means comprises a plurality of graduations marked on the top surface of said ring-shaped member, said mating mark being provided on both the stationary case and the lid-shaped rotor member, said graduations being disposed between the mating mark on the stationary case and the lid-shaped rotor member.

5. The apparatus as recited in claim 1, wherein the end of the flexible tape fixed to the stationary case is connected to a fixed printing wiring board and the other end of the flexible tape fixed o the lid-shaped rotor member is connected to a printed wiring board which is rotatable with the steering wheel.

* * * * *